US00RE45479E

(19) United States
(12) Reissued Patent
Jones et al.

(10) Patent Number: US RE45,479 E
(45) Date of Reissued Patent: Apr. 21, 2015

(54) TRUCK BED TOOLBOX LID HAVING INJECTED FOAM

(75) Inventors: Larry K. Jones, Boston, GA (US); Jimmy Giddens, Perry, FL (US); Neil Ottavi, Thompsons Station, TN (US)

(73) Assignee: Thule Sweden AB, Hillerstorp (SE)

(21) Appl. No.: 12/362,884

(22) Filed: Jan. 30, 2009

Related U.S. Patent Documents

Reissue of:
(64) Patent No.: 7,168,590
Issued: Jan. 30, 2007
Appl. No.: 10/300,968
Filed: Nov. 20, 2002

U.S. Applications:
(63) Continuation-in-part of application No. 09/779,228, filed on Feb. 8, 2001, now abandoned.

(60) Provisional application No. 60/181,858, filed on Feb. 11, 2000.

(51) Int. Cl.
*B65D 43/14* (2006.01)
*B65H 3/02* (2006.01)

(52) U.S. Cl.
CPC ..... *B65H 3/02* (2013.01)

(58) Field of Classification Search
USPC ..... 220/849, 215–217, 220–227, 200, 220/310.1, 836, 210.1, 592.25, 844, 902; 296/100.01–100.1, 101; 29/530; 206/523, 425; 224/404
See application file for complete search history.

(56) References Cited

U.S. PATENT DOCUMENTS 3,078,003 A 2/1963 Kesling
3,678,703 A 7/1972 Cornish et al.
(Continued)

FOREIGN PATENT DOCUMENTS

FR 2601656 A1 1/1988
GB 1152037 A 5/1969

OTHER PUBLICATIONS

Non-Final Office Action; mailed Aug. 24, 2010 in corresponding U.S. Appl. No. 11/801,751.
(Continued)

*Primary Examiner* — Steven A. Reynolds
*Assistant Examiner* — King M Chu
(74) *Attorney, Agent, or Firm* — Novak Druce Connolly Bove + Quigg LLP

(57) ABSTRACT

An improved truck bed toolbox lid and a method of producing the same. The truck bed toolbox lid includes an outer metallic sheet layer comprising a generally rectangular top sheet member, a longitudinal front edge member, two lateral edge members and a longitudinal rear edge member. A metallic liner sheet member is disposed inside the top sheet member in edge contact abutment with beveled inside edges of the front and rear longitudinal edge members and the lateral edge members to create an internal cavity in which the liner is by stitch welding. One or more injection ports are provided through the liner sheet member through which a self-expanding and self-curing, relatively high-density, foam is injected. The stitch welded edge contacts leave non-welded, gas permeable junctions along the wedged cavity periphery at a funneled apex of the edge contacted boundary which facilitate expansion of the foam toward the outermost edges of the cavity.

46 Claims, 4 Drawing Sheets

(56) References Cited

U.S. PATENT DOCUMENTS

| | | | | | |
|---|---|---|---|---|---|
| 3,780,903 | A | * | 12/1973 | Clarkin et al. | 220/646 |
| 3,841,479 | A | * | 10/1974 | Szatkowski | 206/524 |
| 3,854,620 | A | | 12/1974 | Saidla | |
| 3,948,407 | A | | 4/1976 | Puterbaugh | |
| 4,107,833 | A | | 8/1978 | Knight et al. | |
| 4,190,176 | A | * | 2/1980 | Hascoe | 220/359.5 |
| 4,190,305 | A | | 2/1980 | Knight et al. | |
| 4,207,913 | A | * | 6/1980 | Fike, Jr. | 137/68.23 |
| 4,674,665 | A | | 6/1987 | Van Kirk | |
| 4,844,531 | A | * | 7/1989 | Kooiker | 296/100.09 |
| 5,111,955 | A | | 5/1992 | Baker et al. | |
| 5,169,200 | A | | 12/1992 | Pugh | |
| 5,588,731 | A | * | 12/1996 | Schmidt et al. | 312/405 |
| 5,597,086 | A | | 1/1997 | King-Shui | |
| 5,632,522 | A | * | 5/1997 | Gaitan et al. | 296/100.06 |
| 5,664,621 | A | | 9/1997 | Brophy | |
| 5,678,381 | A | * | 10/1997 | DenAdel | 52/836 |
| 5,690,048 | A | * | 11/1997 | Friesen et al. | 114/356 |
| 5,720,142 | A | * | 2/1998 | Morrison | 52/309.9 |
| 5,720,407 | A | * | 2/1998 | Hoffman | 220/215 |
| 5,722,133 | A | | 3/1998 | Farris et al. | |
| 5,743,586 | A | * | 4/1998 | Nett | 296/100.02 |
| 5,755,349 | A | * | 5/1998 | Brundle | 220/1.5 |
| 5,784,769 | A | * | 7/1998 | Clare | 29/401.1 |
| 6,138,432 | A | * | 10/2000 | Banicevic | 52/784.15 |
| 6,217,102 | B1 | * | 4/2001 | Lathers | 296/100.07 |
| 6,257,640 | B1 | | 7/2001 | Leitner et al. | |
| 6,295,787 | B1 | * | 10/2001 | Lee | 52/784.15 |
| 6,340,194 | B1 | * | 1/2002 | Muirhead et al. | 296/100.06 |
| 6,431,633 | B1 | * | 8/2002 | Young et al. | 296/100.02 |
| 6,830,167 | B2 | * | 12/2004 | Schomaker | 224/404 |
| 7,168,590 | B2 | | 1/2007 | Jones et al. | |

OTHER PUBLICATIONS

Distortion Control in Shipbuilding; http://www.wtia.com.au/docs/default-source/free-downloads---defence/tng-d-04-distortion-control-in-shipbuilding.pdf?sfvrsn=4 Date of access: Sep. 6, 2013; Priority date: Apr. 21, 2006.

English abstract for FR2601656; published on Jan. 22, 1988 and retrieved on Apr. 15, 2014.

Final Office Action mailed Sep. 26, 2013; in corresponding U.S. Appl. No. 13/313,294.

* cited by examiner

TRUCK BED TOOLBOX LID HAVING INJECTED FOAM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

This [continuation-in-part application claims the benefit of U.S. Provisional Application Ser. No. 60/181,858, filed Feb. 11, 2000, and U.S. patent application Ser. No. 09/779,228 filed Feb. 8, 2001 now abandoned] *application is a reissue of U.S. patent application Ser. No. 10/300,968, filed Nov. 20, 2002, now U.S. Pat. No. 7,168,590, which is a continuation-in-part application of U.S. patent application Ser. No. 09/779,228, filed Feb. 8, 2001 now abandoned, which claimed priority from U.S. Provisional Application No. 60/181,858.*

BACKGROUND OF THE INVENTION

1. Technical Field

The present invention relates generally to the field of truck bed toolboxes. More particularly, the present invention relates to an improved truck bed toolbox and toolbox lid combination that is structurally improved to better withstand the bending and twisting forces experienced by such toolboxes as disposed and utilized in the beds of pick-up trucks.

2. Description of the Related Art

A truck bed toolbox is a well known pick-up truck accessory which is essentially a storage cabinet designed for outdoor exposure and having a distinctive outer contour and dimensions suitable for being fixedly mounted in the open bed of a pick-up truck, generally just to the rear of the passenger compartment. Such a toolbox typically comprises a generally rectangular, open topped lower receptacle or tub, to which is pivotally attached one or more lid members. A single lid is typically attached by hinges affixed along the longitudinal rear edge of the lid and the back wall of the tub if a single lid, or a pair of lids are affixed by hinges affixed transversely adjacent the lateral middle of the tub. Closure means, latches, locks or the like are provided to secure the lid or lids in the closed positioned. The box may be provided with lift cylinders and detent means to maintain the lid in the open position, or other features. Such devices are well known, and typified in being constructed of metallic sheet members suitable for accommodating large, heavy metallic tools.

The truck bed box/lid combination are typically constructed of relatively rigid, aluminum sheet material having requisite strength and corrosion resistance characteristics. The individual aluminum panels of a truck bed toolbox typically have a thicknesses of from 0.080 to 0.063 mil, and are welded or mechanically fastened to define the sheet metal box structure characteristic of truck bed tool boxes. Since they must span the width of a truck bed compartment, these specialized toolboxes are relatively large typically ranging from 54 to 75 inches in width, from 19 to 28 inches in depth and from 13 to 14 inches in height. The disproportionate width (i.e. 54 to 75 inches) is a distinct characteristic of truck bed toolboxes for helping to maintain the toolbox anchored in relative abutment with the interior sidewalls of the truck bed such that the toolbox remains within a designated cross section area of the truck bed while experiencing shifting forces resulting from the truck's motion while being driven. The disproportionate width dimension is also useful for truck bed applications by rendering the lid accessible to a user standing on the side of the host truck's bed and reaching over the bed sidewall to open the toolbox.

Because the lid is the main movable component of the toolbox, it is subjected to repetitive forces from many directions and is therefore the component most susceptible to damage or failure. Due to the relatively large width dimension necessitated by the reasons set forth above and its flat, metallic sheet construction, a truck bed tool box lid is particularly susceptible to twisting and bending forces resulting from users opening the toolbox by pushing up on or near an outer end of the lid accessible while standing outside the truck bed. If the lid becomes twisted or otherwise misaligned, proper closure to seal the box from the elements becomes difficult or impossible, and the toolbox must then be repaired or replaced. It is therefore necessary to impart significant rigidity to prevent the lid from bending, crimping, torqueing, twisting, failing or becoming misaligned relative to the tub. It is standard practice to fasten structural bracing members on the underside of the lid to increase planar rigidity, the bracing members extending either longitudinally or laterally, but the efficacy of these brace members is limited by the desire to minimize cost and weight factors, such that manufacturers attempt to use the smallest or the fewest brace members which will still provide a minimally acceptable increase in rigidity and structural integrity.

Another method for increasing the rigidity and structural integrity of the lid is to provide an interior liner sheet to form a cavity into which pre-cured, cut-to-size, rigid foam sheets are inserted. However, in order to achieve the desired load transfer across the component materials necessary to resist shearing and buckling forces requires that adhesive agents be applied to the contact surfaces which greatly increases the time and cost of production of each truck bed toolbox lid. Furthermore, employing pre-formed foam sheets results in cutting the foam sheets to size resulting in significant waste of materials and in environmental hazards in disposing of the same.

It can therefore be appreciated that a need exists for an improved truck bed toolbox lid and method of producing the same, wherein the truck bed toolbox lid is lighter and less susceptible to misalignment.

SUMMARY OF THE INVENTION

An improved truck bed toolbox, an improved truck bed toolbox lid, and a method of producing the same are disclosed herein. The truck bed toolbox lid includes a metallic liner bounded cavity filled with high density injected foam to provide superior strength and rigidity, to maintain the lid alignment and to virtually eliminate the need to adjust lid strikers. In accordance with the present invention, the lid comprises an outer layer of aluminum or similar sheet material, the outer layer comprising a generally rectangular top sheet member, a longitudinal front edge member, two lateral edge members and a longitudinal rear edge member, where the edge members depend from the metallic top sheet member and overlap the upper edges of the truck bed toolbox rectangular tub or base. A liner sheet member of aluminum or other suitable metal is positioned to the inside of and substantially parallel to the metallic top sheet member. The liner sheet member is spaced a short distance from the top sheet member to create an internal cavity in which the liner is disposed in edge contact abutment with beveled inside edges of the front and rear longitudinal edge members and the lateral edge members by stitch welding. One or more injection ports are provided through the liner sheet member through which a self-expanding and self-curing, relatively high-density, foam is injected to completely fill the interior cavity. The stitch welded edge contacts leave non-sealed, gas permeable junctions along the wedged cavity periphery at the funneled apex of the edge contacted boundary which facilitate expansion of the foam toward the outermost edges of the cavity to maximize the foam coverage at points furthest from the foam injection site. The cured, expanded foam adheres to the inside surfaces of the metallic top sheet member and the inside surface of the metallic liner sheet member, creating a rigid composite structure whereby shearing and twisting forces are more evenly distributed through the composite structure, such that the lid is able to withstand much greater detrimental forces without permanent flexing, bending, crimping or failure.

DETAILED DESCRIPTION OF THE INVENTION

With reference to the drawings, the invention will now be described in detail with regard for the best mode and the preferred embodiment.

As explained in further detail with reference to the figures, the present invention is directed to an improved truck bed toolbox lid having greater rigidity and resistance to bending and twisting than standard constructions, where the improved lid is relatively easy to manufacture at lower costs. The improved internal support is provided by an improved injected foam process and results in a highly resilient truck bed toolbox lid having optimum rigidity characteristics such that the thickness of the lid shell material may be reduced (from 0.080 mil to 0.063 mil, for example) while increasing the flexural integrity of the lid. Furthermore, the improved truck bed toolbox lid assembly method described herein provides a more efficient assembly line process resulting in less man-hours per toolbox assembly and a corresponding increase in the rate of production.

Figure 1:
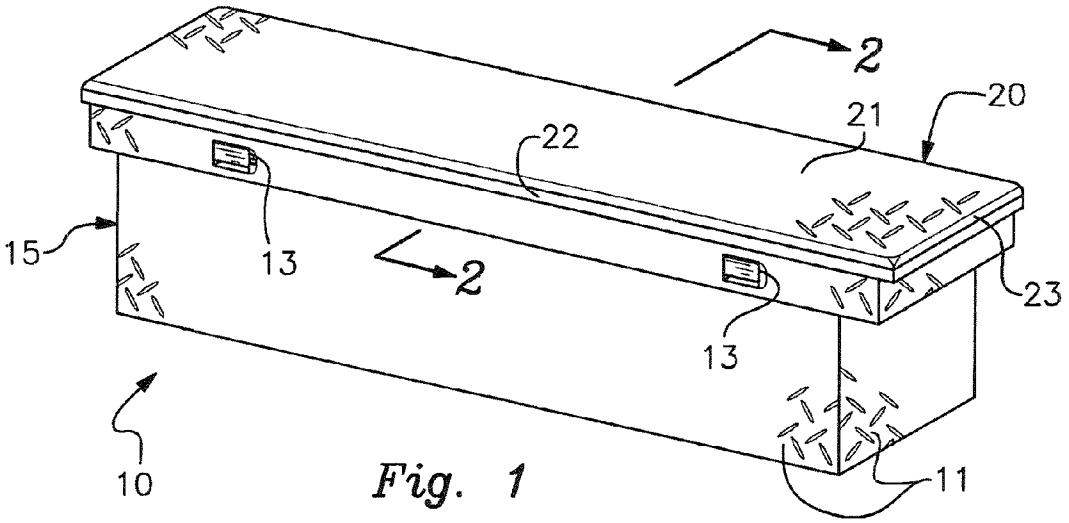
FIG. 1 is a perspective view showing a truck bed toolbox according to the present invention with the lid in the closed position attached to the tub.

With reference now to the figures wherein like reference numerals refer to like and corresponding parts throughout, and in particular with reference to FIG. 1, there is depicted a perspective view showing a truck bed toolbox according to the present invention with the lid in the closed position attached to the tub. In particular, FIGS. 1 illustrates the apparatus of the present invention as generally comprising a structurally superior truck bed toolbox lid 20 for a truck bed toolbox 10 of the type configured to be positioned in the bed of the open cargo area of a pick-up truck, usually abutting the rear of the cab and extending laterally across the bed. The box 10 typically includes a generally rectangular tub or base member 15 having upstanding side walls 11 with upper edges 12. The box 10 is provided with latching or locking means 13 to secure the lid 20 in the closed position, and the lid 20 is pivotally joined to the tub 15 by hinge means 14. The major structural components are preferably composed of sheet metal, such as aluminum. In the depicted embodiment, the box 10 is shown as comprising a single lid 20, but it is to be understood that the structure as described herein is applicable to truck bed toolboxes having pairs of lid members, in which case the lid members are pivotally joined to the tub along a lateral edge, preferably an interior lateral edge with the hinges mounted transversely.

Preferably, the tub 15 is produced by cutting and folding an aluminum sheet to create the front, bottom and back walls with the side walls welded to create the full base structure. Likewise, the outer panels of the lid 20 are preferably formed by cutting and folding a single aluminum sheet to form the top sheet member 21, front edge member 22, lateral edge members 23 and rear edge member 24.

Figure 2:
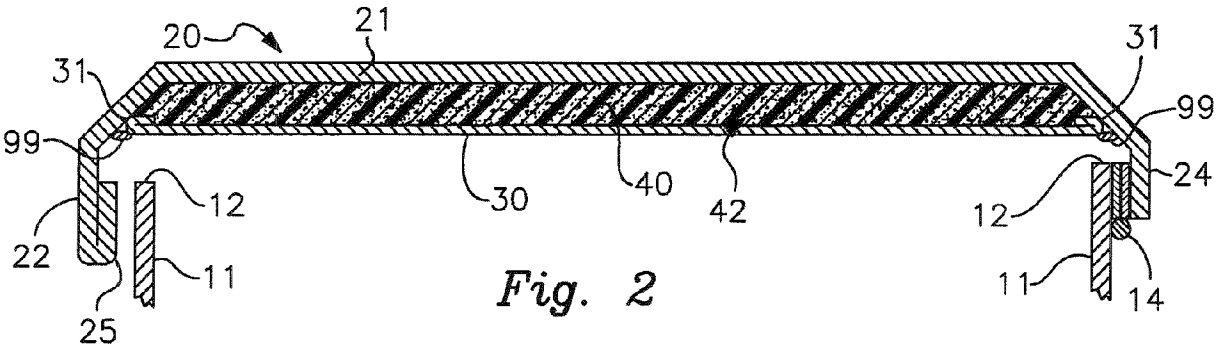
FIG. 2 is a cross-sectional view of a truck bed toolbox lid in accordance with one embodiment of the present invention.

Referring to FIG. 2 in conjunction with FIG. 1, the truck bed toolbox lid 20 comprises a generally planar top or outer sheet member 21 from which depend a longitudinal front edge member 22, a pair of opposing lateral edge members 23 and a rear edge member 24, where one or more hinge means 14 are connected in some manner to the rear edge member 24 such that the lid 20 can be pivoted preferably at least 90 degrees from the tub 15 in the open position. Lift cylinders or detent means, not shown but known in the art, may be provided to retain the lid 20 in the open position. The edge members 22, 23 and 24 form a complete perimeter around the metallic top sheet member 21, which is sized to allow the edge members 22, 23 and 24 to overlap the upper edges 12 of the tub walls 11 to preclude entry of rain, dirt and other detrimental environmental effects. As depicted in FIGS. 1 and 2, edge members 22, 23 and 24 are preferably partially beveled between the top horizontal surface of top sheet member 21 and the vertically depending portion of the edge members. Furthermore, all or some of edge members 22, 23 and 24 may be provided with a hem 25, which is formed by bending the outer portion of the edge member 22, 23 or 24 back upon itself such that a rounded configuration is presented in areas where the user may contact the edge members 22, 23 and 24.

The truck bed toolbox lid 20 further comprises a metallic liner sheet member 30, preferably formed of a sheet metal such as aluminum, which is mounted on the inside of the metallic top sheet member 21. The metallic liner sheet member 30 is preferably planar and substantially coextensive and parallel with the metallic top sheet member 21 in the horizontal direction, but is separated from the metallic top sheet member 21 a short distance to define an interior cavity 42. As depicted in FIG. 2, the metallic liner sheet member 30 is preferably disposed at its edges 31 in substantially continuous abutment along the inside beveled surfaces of edge members 22, 23 and 24. The edges 31 of the liner sheet member 30 are fixedly connected to the edge members 22, 23 and 24 by multiple, individual stitch or spot welds 99 preferably having a width from 0.5" to 1.5" and being spaced apart by 2" to 6" along the perimeter of metallic liner sheet member 30. In accordance with a preferred embodiment, the liner edges 31 are hemmed or otherwise bent or manipulated to provide a suitably enlargened weld surface on liner edges 31 and furthermore to provide a suitably dimensioned "well" in which a heat-activated adhesive can be deposited after stitch welding. Preferably the stitch welds 99 extend for short distances of one inch or less, as this technique minimizes damage to the aluminum sheets from the heat of welding. Moreover, utilization of discrete weld joints in this manner provides a particularly well-suited forum for implementing a foam injection technique explained in further detail with reference to FIG. 3. In alternative embodiments, suitable means such as mechanical fasteners may be utilized for applying discrete suitably spaced attachment joints to affix the metallic liner sheet member 30 to the metallic top sheet member 21.

Figure 3:
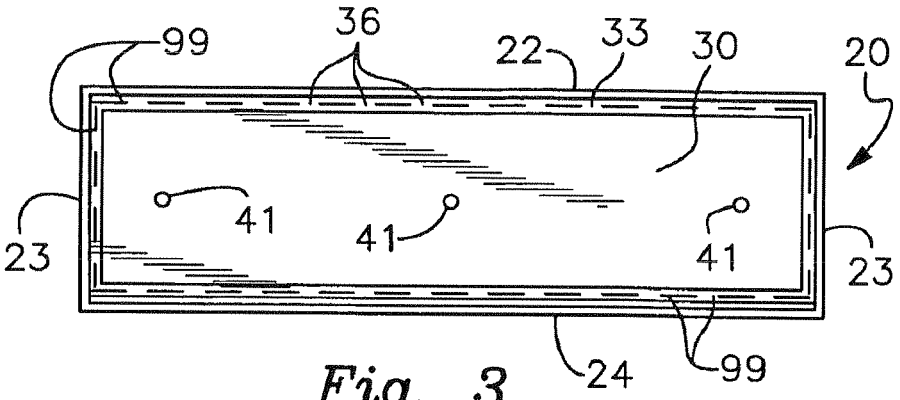
FIG. 3 is a bottom view of a truck bed toolbox lid in accordance with one embodiment of the present invention.

With reference to FIG. 3, there is illustrated a bottom view of a truck bed toolbox lid in accordance with one embodiment of the present invention. Specifically, FIG. 3 depicts the underside of the lid 20 wherein the rectangular periphery of liner sheet member 30 is situated in edge contact within a continuous, beveled edge perimeter 33 formed along the depending front, rear and lateral edge members on the underside cavity of the top sheet member 21. The metallic liner sheet member 30 is provided with one or more injection ports or apertures 41, which allow a self-expanding, self-curing foam material 40 to be injected into the interior cavity 42, where it self-bonds and adheres without need for application of a separate adhesive material to the inside of the metallic top sheet member 21, the metallic liner sheet member 30 and the edge members 22, 23 and 24, depending on the configuration of the metallic liner sheet member 30, to create a rigid, integral, composite material lid 20 which has improved damage- and failure-resistance properties. A suitable foam 40 for injection into the interior cavity 42 is a combination of ISOFOAM R-1322B, a polyurethane polyol blend containing a surfactant, catalyst, flame retardant and hydrochlorofluorocarbon, and ISOFOAM I-0732A, a polyurethane isocyanate, sold by IPI International, Inc., which upon reaction forms a foam of relatively high density which adheres to the aluminum members and cures into a rigid body.

Between the multiple stitch welds 99 are corresponding weld gaps 36 through which air and gases incident to the foam expansion process can escape through the gas permeable non-welded portions of the liner-to-top-sheet-member edge junction at the periphery of the inner liner member 30 that facilitates comprehensive migration of the foam toward the edges of the inner liner member 30 thereby defining a funneled, gas permeable apex boundary. This gas exhaust capability is usefully employed in the parallel plane boundary of the internal cavity 42 in which upon injection of the liquid foam, pockets of air and other gases may become sealed off by the expanding foam from otherwise available vent holes through the surface of liner sheet member 30. The parallel plane internal contour of the internal cavity 42 ensures that gasses that are not exhausted through the injection or ventilation ports in the surface of the inner sheet member 30 are directed toward the outermost apex boundary of the internal cavity 42 where the wedged contour of the liner-sheet-to-beveled-edge boundary creates a nozzle effect that facilitates expulsion of the gasses through the weld gaps 36. Furthermore, although gas permeable, the non-welded contact junctions at weld gaps 36 between the edges of the inner liner 30 and the beveled portions of the top sheet edges 22, 23 and 24 provides a significant degree of resistance to foam expansion to prevent excessive foam expansion through the weld gaps 36 sufficient to account for any incidental process variations of a timed or metered foam injection process.

Figure 4:
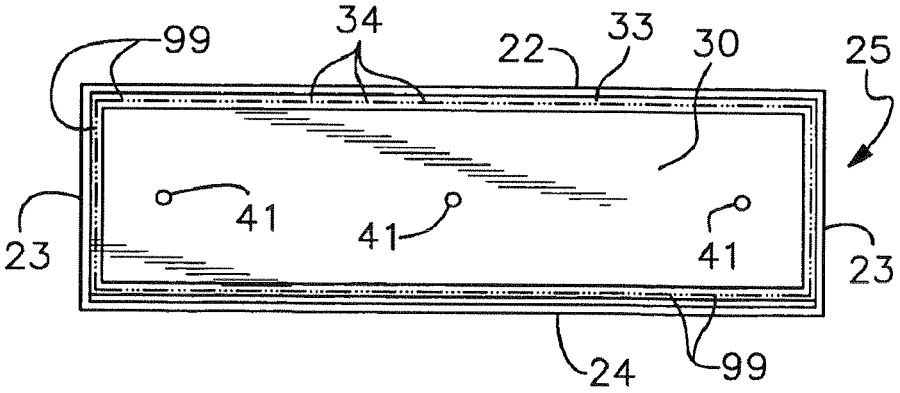
FIG. 4 is a bottom view of a truck bed toolbox lid in accordance with an alternate embodiment of the present invention.

An alternative truck bed toolbox lid 25 is depicted in FIG. 4, wherein a hot glue seal 34, referred to alternatively as a hot melt seal, is disposed along the gaps of the outer perimeter of the metallic liner sheet member 30, such that upon cooling the hot glue scaling member forms a continuous seal between the inside surface of the top sheet member 21 and the outer edge perimeter of the liner sheet member 30. As explained in further detail with reference to FIG. 6, hot glue seal 34 is applied during assembly of the truck bed toolbox lid prior to injection of the foam into the internal cavity 42. Hot glue seal 34 retains the foam 40 within a defined area and prevents the foam 40 from expanding through the weld gaps 36 between the stitch welds 99.

It has been found that the presence of the cured foam 40 in the interior cavity 42 bonding the upper sheet member 21 to the metallic liner sheet member 30 is a much stronger construction than that of the previously known constructions, enabling thinner metal sheets to be utilized in the construction of the lids 20 and obviating the need for interior bracing members, which lowers material costs yet still provides improved properties over standard constructions. For example, a suitable lid 20 is formed with a one half to three quarter inches in depth cavity 42 between a liner sheet member 30 of only 0.050 mil metallic sheet thickness and a top sheet member 21 of only 0.063 mil metallic sheet thickness.

Figure 6:
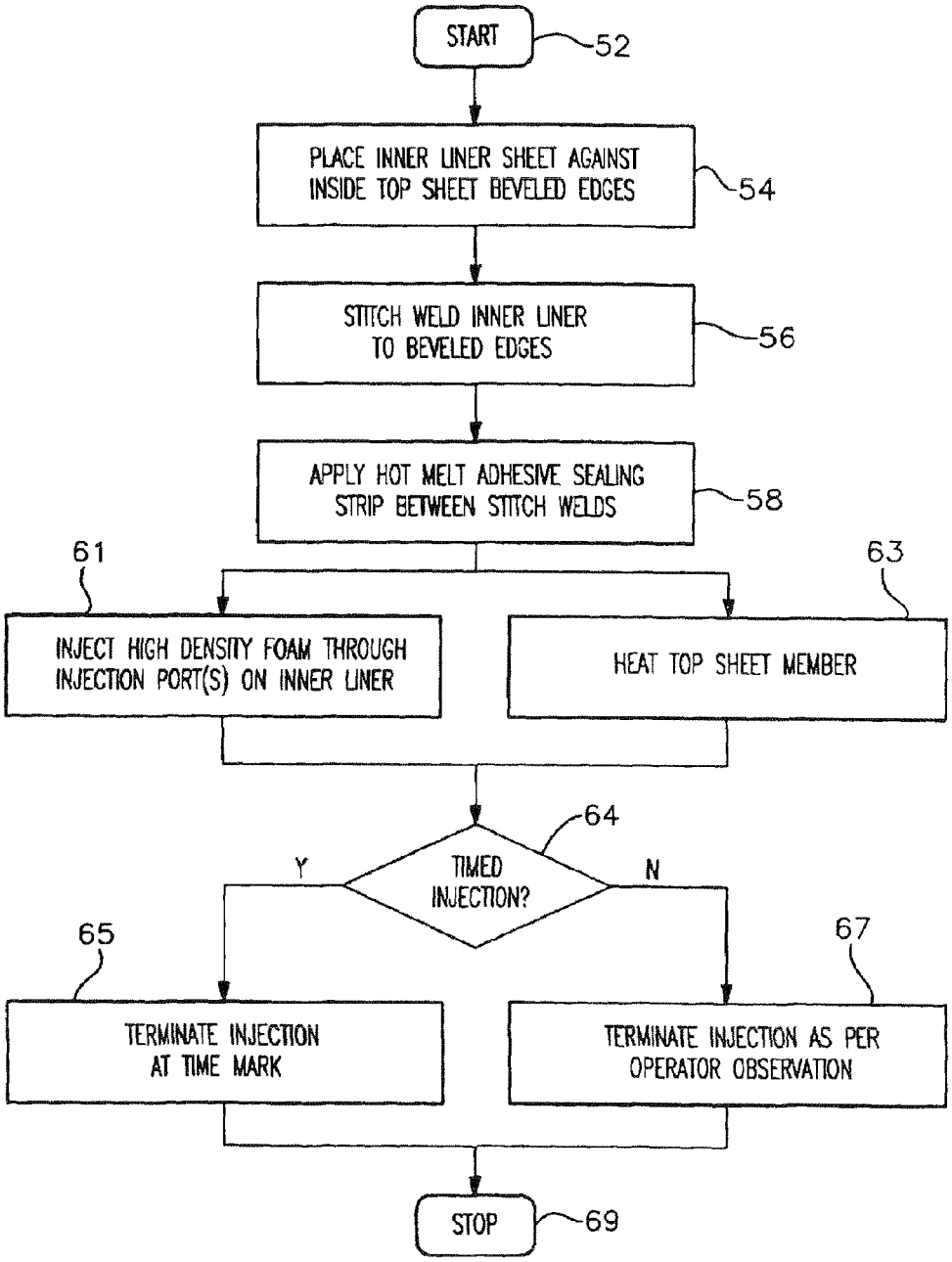
FIG. 6 is a flow diagram illustrating steps performed during production of a truck bed toolbox lid in accordance with a preferred embodiment of the present invention.

Referring to FIG. 6, there is depicted a flow diagram illustrating steps performed during production of a truck bed toolbox lid in accordance with a preferred embodiment of the present invention. The process begins as shown at step 52 and proceeds to steps 54 and 56 with the inner sheet liner 30 being placed on and stitch welded to the beveled edge perimeter 33. Next, as depicted at step 58, hot glue seal 34 is applied along the stitch welded perimeter. In accordance with one embodiment, the seal is applied using a glue gun (not depicted) consisting of a handle, an electrically heated, thermostatically controlled melting chamber and an application nozzle. The hemmed liner edges 31 form a provide a suitably dimensioned trough or "well" in which the heat-activated adhesive can be deposited after stitch welding. It should be noted that the hot glue application step 58 is optional and that the truck bed toolbox lid 20 may be produced as previously discussed without utilizing the hot glue seal 34.

Figure 5:
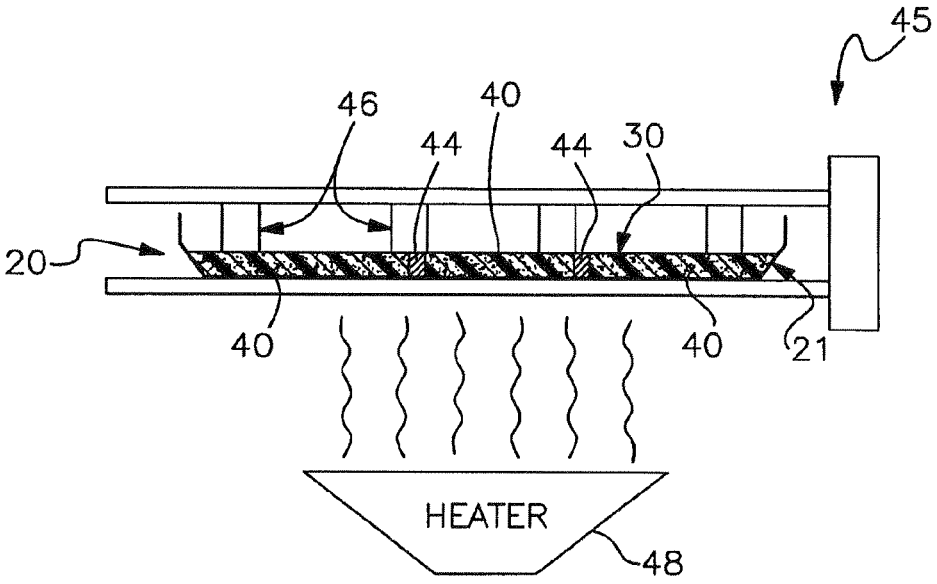
FIG. 5 depicts an apparatus for preparing and assembling a truck bed toolbox lid in accordance with a preferred embodiment of the present invention.

Following application of hot glue seal 34, the truck bed toolbox lid 20 is placed in a clam-style jig in preparation for the foam injection process. FIG. 5 illustrates an example clam-style jig 45 into which the truck bed toolbox lid 20 is placed prior to and during the foam injection process. Cavity support members 44 are provided within the interior cavity 42 to structurally support the liner sheet member 30 prior to the foam injection process. The liner sheet member 30 is braced by suitable blocks 46 such that it does not flex outward after the foam 40 begins to expand. Proceeding to step 61, the foam is injected through the injection ports 41 in metered amount under controlled conditions such that the interior cavity 42 is filled to capacity upon expansion and curing. As illustrated at step 63, prior to and/or during the foam injection step, a heater element 48 is situated beneath the braced lid and utilized to heat the metallic sheet members 30 and 21 to control the rate at which the injected foam cures and thereby facilitate maximum expansion and a relatively uniform time at which the expanded foam finally cures as a rigid member. The injection is terminated (step 69) either automatically, if using a metered or timed foam injection system (steps 64 and 65), or in accordance with an operators inspection and judgment (steps 64 and 67).

Following the foam injection process, the injection ports 41 are covered by one or more adhesive members so that the foam 40 does not expand through the injection ports 41. The lid 20 is left in the jig for sufficient time such that the vast majority of the expansion has occurred, and the lid 20 is then removed from the jig and allowed to fully cure. With this structure, the lid 20 can be further processed, such as by powder coating, painting or the like to produce aesthetic improvements, some of which processes require high temperature environments detrimental to the foam 40, with the foam 40 later injected into the interior cavity 42 to increase structural rigidity and stiffness.

Tests on lids 20 constructed as described versus standard lids or lids with inserted pre-cured, cut-to-size, foam panels show remarkable improvements relative to desired stiffness characteristics. In a first test apparatus, lids were clamped or secured along one end to a horizontal platform such that approximately half the lid extended beyond the edge of the platform. Pressure was applied using a hydraulic jack to the free end of the lid adjacent the free lateral edge member 23 at the midpoint or center. Pressure was applied until the lid failed, with failure defined to be crimped edges with the lid taking on a permanently deformed set. The lid 20 of the invention was able to withstand up to 480 psi of vertical pressure prior to failure, while the standard lid construction failed at 250 psi and the insert construction failed at 360 psi. In addition, the standard lid construction failed at only 1.25 inches of deflection, the insert construction failed at only 4 inches of deflection, while the lid 20 of the invention did not fail until deflected 6.25 inches. In other words, the lid 20 of the invention could be flexed slightly less than 6.25 inches at 480 psi and would resume its pre-test shape without any permanent deformation.

In a second test, the pressure was applied to one corner of the free end of the lids to introduce torque. For the torque load tests, the invention withstood up to 490 psi without failure, while the standard lid failed at 280 psi and the insert lid failed at 310 psi. The standard lid failed at only 1.25 inches of deflection and the insert construction failed at only 5 inches of deflection. The lid 20 of the invention did not fail even at deflection of almost 7.5 inches under the failure definition set forth above.

It is contemplated that equivalents and substitutions to certain elements set forth above may be obvious to those skilled in the art, and thus the true scope and definition of the invention is to be as set forth in the following claims.

We claim:

1. A truck bed toolbox lid comprising:

a substantially flat metallic top sheet member having a depending front edge member, a depending rear edge member and depending lateral edge members;

a substantially flat metallic liner sheet member joined to said top sheet member so as to define an internal cavity; and a rigid, expanded, cured foam disposed within said internal cavity and bonded to said top sheet member and said liner sheet member, characterized in that said foam is injected into said cavity in an uncured, unexpanded state and expands and cures so as to self-bond to the metallic surfaces of said top sheet member and said liner sheet member to form an integral, composite truck bed toolbox lid;

said truck bed toolbox lid further comprising a hot melt adhesive sealing member disposed [alone] *along* the perimeter of said liner sheet member, whereby upon cooling said hot melt adhesive sealing member forms a seal between the inside surface of said top sheet member and the outer edge perimeter of said liner sheet member to retain said foam within said internal cavity.

2. The truck bed toolbox lid of claim 1, further comprising a plurality of stitch weld joints connecting the outer edge perimeter of said liner sheet member to said top sheet member.

3. The truck bed toolbox lid of claim 1, wherein said foam is a high density polyurethane foam.

4. A truck bed toolbox lid comprising:

a substantially flat metallic top sheet member having a depending front edge member, a depending rear edge member and depending lateral edge members;

a substantially flat metallic liner sheet member joined to said top sheet member so as to define an internal cavity; and a rigid, expanded, cured foam disposed within said internal cavity and bonded to said top sheet member and said liner sheet member, characterized in that said foam is injected into said cavity in an uncured, unexpanded state and expands and cures so as to self-bond to the metallic surfaces of said top sheet member and said liner sheet member to form an integral, composite truck bed toolbox lid;

characterized in that said lid remains uncrimped with no permanent set upon deflection up to approximately 6.25 inches under up to approximately 480 psi when said lid is secured on a horizontal platform with approximately half said lid extending beyond said platform and subjected to center pressure adjacent one of said lateral edge members.

5. A truck bed toolbox lid comprising:

a substantially flat metallic top sheet member having a depending front edge member, a depending rear edge member and depending lateral edge members;

a substantially flat metallic liner sheet member joined to said [ton] *top* sheet member so as to define an internal cavity; and a rigid, expanded, cured foam disposed within said internal cavity and bonded to said top sheet member and said liner sheet member, characterized in that said foam is injected into said cavity in an uncured, unexpanded state and expands and cures so as to self-bond to the metallic surfaces of said top sheet member and said liner sheet member to form an integral, composite truck bed toolbox lid;

characterized in that said lid remains uncrimped with no permanent set upon deflection up to approximately 7.5 inches under up to approximately 490 psi when said lid is secured on a horizontal platform with approximately half said lid extending beyond said platform and subjected to corner pressure adjacent one of said lateral edge members.

6. The truck bed toolbox lid of claim 1, wherein said top sheet member is formed of an aluminum sheet having a thickness of approximately 0.063 mil.

7. The truck bed toolbox lid of claim 1, wherein said liner sheet member is disposed generally parallel to said top sheet member.

8. The truck bed toolbox lid of claim 1, wherein at least one of said front edge member, said depending rear edge member and said depending lateral edge members is a hemmed edge.

9. The truck bed toolbox lid of claim 1, wherein said internal cavity is approximately one half to three quarter inches in depth between said top sheet member and said liner sheet member.

10. A truck bed toolbox lid comprising:

a substantially flat metallic top sheet member having a depending front edge member, a depending rear edge member and depending lateral edge members, wherein an edge perimeter is formed along the depending front, rear and lateral edge members;

a substantially flat metallic liner sheet member joined to said top sheet member in edge contact abutment with said edge perimeter so as to define an internal cavity having a funneled, gas permeable apex boundary; and a rigid, expanded, cured foam disposed within said internal cavity and bonded to said top sheet member and said liner sheet member, characterized in that said foam is injected into said cavity in an uncured, unexpanded state, expands toward said funneled, gas permeable apex boundary and cures so as to self-bond to the metallic surfaces of said top sheet member and said liner sheet member to form an integral, composite truck bed toolbox lid;

further comprising a plurality of stitch weld joints that fixedly couple the perimeter of said liner sheet member with said edge perimeter, such that gas permeable, non-welded gaps remain between said plurality of stitch weld joints.

11. The truck bed toolbox lid of claim 10, wherein said edge perimeter is beveled.

12. The truck bed toolbox lid of claim 4, wherein said liner sheet member is disposed generally parallel to said top sheet member.

13. The truck bed toolbox lid of claim 4, wherein at least one of said front edge member, said depending rear edge member and said depending lateral edge members is a hemmed edge.

14. The truck bed toolbox lid of claim 5, wherein said liner sheet member is disposed generally parallel to said top sheet member.

15. The truck bed toolbox lid of claim 5, wherein at least one of said front edge member, said depending rear edge member and said depending lateral edge members is a hemmed edge.

16. The truck bed toolbox lid of claim 10, wherein said top sheet member is formed of an aluminum sheet having a thickness of approximately 0.063 mil.

17. The truck bed toolbox lid of claim 10, wherein said liner sheet member is disposed generally parallel to said top sheet member.

18. The truck bed toolbox lid of claim 10, wherein at least one of said front edge member, said depending rear edge member and said depending lateral edge members is a hemmed edge.

19. The truck bed toolbox lid of claim 10, wherein said internal cavity is approximately one half to three quarter inches in depth between said top sheet member and said liner sheet member.

*20. A truck bed toolbox lid comprising:*

*a metallic top sheet member having depending front edge members defining an edge parameter;*

*a metallic liner sheet member joined to said metallic top sheet member by a plurality of stitch weld joints that fixedly couple a perimeter to said liner sheet member with said edge perimeter, such that gas permeable, non-welded gaps remain between said plurality of stitch weld joints and thereby define an internal cavity having a gas permeable boundary; and*

*a rigid, expanded, cured foam disposed into said internal cavity and said foam adhering to said metallic top sheet member and said metallic liner sheet member,*

*wherein said metallic top sheet member, said foam and said metallic liner sheet member form an integral, composite truck bed toolbox lid.*

*21. The truck bed toolbox lid of claim 20, wherein said metallic liner sheet member is sized such that said metallic liner sheet member is substantially coextensive with said metallic top sheet member.*

*22. The truck bed toolbox lid of claim 20, wherein said metallic liner sheet member is disposed generally parallel to said metallic top sheet member.*

*23. The truck bed toolbox lid of claim 20, wherein said metallic liner sheet member and said metallic top sheet member are heated prior to deposing said foam.*

*24. A truck bed toolbox comprising:*

*a metallic top sheet member having depending edge members;*

*a flat metallic liner sheet member joined to said metallic top sheet member in a manner which defines a cavity therebetween; and*

*a foam-forming material injected into said cavity such that foam formed thereby adheres to said metallic top sheet member and said metallic liner sheet member so as to form a strengthened composite truck bed toolbox lid; and*

*a generally rectangular, generally tub-shaped, open-topped lower receptacle;*

*wherein said lid is pivotally attached to said lower receptacle whereby the lid pivots upwardly to expose the interior of the lower receptacle*

*said truck bed toolbox lid further comprising a hot melt adhesive sealing member disposed along the perimeter of said liner sheet member, whereby upon cooling said hot melt adhesive sealing member forms a seal between the inside surface of said top sheet member and the outer edge perimeter of said liner sheet member to retain said foam within said internal cavity.*

*25. The truck bed toolbox of claim 24, wherein a sufficient amount of the foam-forming material is injected into said cavity such that the lid can be deflected in excess of four inches while remaining uncrimped, with no permanent set, when said lid, before being joined to the lower receptacle, is secured on a horizontal platform with approximately half the length of said lid extending beyond said platform and said lid is subjected to center pressure adjacent one of said depending edge members.*

*26. The truck bed toolbox of claim 24, wherein a sufficient amount of the foam-forming material is injected into said cavity such that the lid can be deflected to 7.5 inches while remaining uncrimped, with no permanent set, when said lid, before being joined to the lower receptacle, is secured on a horizontal platform with approximately half the length of said lid extending beyond said platform and said lid is subjected to corner pressure adjacent one of said depending edge members.*

*27. The truck bed toolbox of claim 24, wherein said metallic liner sheet member is joined to said metallic top sheet member at a plurality of discrete locations with gaps therebetween through which gas can escape.*

*28. The truck bed toolbox of claim 24, wherein said metallic liner sheet member is joined to said metallic top sheet member by welding.*

*29. The truck bed toolbox of claim 24, wherein said metallic liner sheet member is joined to said metallic top sheet member by stitch welding.*

*30. The truck bed toolbox of claim 24, wherein the metallic top sheet member is 0.063 inch thick.*

*31. A truck bed toolbox lid comprising:*

*a metallic top sheet member having depending edge members defining an edge perimeter;*

*a substantially flat metallic liner sheet member joined to said top sheet member in a manner to form a cavity therebetween using a plurality of stitch weld joints at discrete locations that fixedly couple a perimeter of said liner sheet member with said edge perimeter whereby gas permeable, non-welded gaps remain between said plurality of stitch welded joints thereby providing a passageway for gas to escape; and*

*a foam-forming material disposed into said cavity such that said foam-forming material forms a foam upon curing thereby adhering to said metallic top sheet member and said metallic liner sheet member so as to form a strengthened composite truck bed toolbox lid with gas escaping via the gaps during the curing of the foam-forming material.*

*32. A truck bed toolbox lid comprising:*

*a metallic top sheet member having a depending front edge member, a depending rear edge member and depending lateral edge members;*

*said edge members together defining an edge perimeter about said edge members;*

*a metallic liner sheet member having a perimeter and being joined to said metallic top sheet member so as to define an internal cavity having a gas permeable boundary, and*

*a rigid, expanded, cured foam disposed into said internal cavity and said foam adhering to said metallic top sheet member and said metallic liner sheet member,*

*wherein said metallic top sheet member, said foam and said metallic liner sheet member form an integral, composite truck bed toolbox lid;*

*further comprising a plurality of stitch weld joints that fixedly couple the perimeter of said liner sheet member with said edge perimeter such that gas permeable, non-welded gaps remain between said plurality of stitch welded joints.*

*33. A truck bed toolbox lid comprising:*

*a metallic top sheet member having depending edge members that define an edge perimeter;*

*a metallic liner sheet member having a perimeter and being joined to said top sheet member in a manner which defines a cavity therebetween; and*

*a foam-forming material injected into said cavity such that said foam-forming material forms a foam upon curing thereby adhering to said metallic top sheet member and said metallic liner sheet member so as to form a strengthened composite truck bed toolbox lid;*

*further comprising a plurality of stitch weld joints that fixedly couple the perimeter of said liner sheet member with said edge perimeter such that gas permeable, non-welded gaps remain between said plurality of stitch weld joints.*

*34. A truck bed toolbox comprising:*

*a metallic top sheet member having depending edge members that define an edge perimeter;*

*a metallic liner sheet member having a perimeter and being joined to said top sheet member in a manner which defines a cavity therebetween; and*

*a foam-forming material injected into said cavity such that said foam-forming material forms a foam upon curing thereby adhering to said metallic top sheet member and said metallic liner sheet member so as to form a strengthened composite truck bed toolbox lid; and*

*a generally rectangular, generally tub-shaped, open-topped lower receptacle;*

*wherein said lid is pivotally attached to said lower receptacle whereby the lid pivots upwardly to expose the interior of the lower receptacle;*

*further comprising a plurality of stitch weld joints that fixedly couple the perimeter of said liner sheet member with said edge perimeter such that gas permeable, non-welded gaps remain between said plurality of stitch weld joints.*

*35. A truck bed toolbox lid comprising:*

*a metallic top sheet member having depending edge members that define an edge perimeter;*

*a substantially flat metallic liner sheet member having a perimeter and being joined to said top sheet member with a cavity therebetween by a plurality of stitch weld joints at discrete locations that fixedly couple the perimeter of said liner sheet member with said edge perimeter such that gas permeable, non-welded gaps remain between said plurality of stitch weld joints, said gaps providing a passageway for gas to escape;*

*a foam-forming material disposed into said cavity such that said foam-forming material forms a foam upon curing thereby adhering to said metallic top sheet member and said metallic liner sheet member so as to form a strengthened composite truck bed toolbox lid with gas escaping via the gaps during the curing of the foam-forming material.*

*36. A truck bed toolbox lid comprising:*

*a metallic top sheet member having a depending front edge member, a depending rear edge member and depending lateral edge members;*

*a metallic liner sheet member joined to said metallic top sheet member so as to define an internal cavity;*

*a rigid, expanded, cured foam disposed into said internal cavity, said cured foam adhering to said metallic top sheet member and said metallic liner sheet member, wherein said metallic top sheet member, said foam and said metallic liner sheet member form an integral, composite truck bed toolbox lid and upon curing of said foam, the rigidity of the combination of said metallic top sheet member and said metallic liner sheet member is increased; and*

*said lid remains uncrimped with no permanent set upon deflection up to approximately 7.5 inches under up to approximately 490 psi when said lid is secured on a horizontal platform with approximately half said lid extending beyond said platform and subjected to corner pressure adjacent one of said lateral edge members.*

*37. The truck bed toolbox lid of claim 36, wherein said metallic top sheet member is sized such that said metallic liner sheet member is substantially coextensive with said metallic top sheet member.*

*38. The truck bed toolbox lid of claim 36, wherein said metallic top sheet member is disposed generally parallel to said metallic liner sheet member.*

*39. The truck bed toolbox lid of claim 36, wherein said metallic liner sheet member and said metallic top sheet member are heated and said foam undergoes maximum expansion and cures in a relatively uniform time.*

*40. A truck bed toolbox lid comprising:*

*a metallic top sheet member having a plurality of depending edge members that form an edge perimeter;*

*a metallic liner sheet member joined to said top sheet member in a manner which defines a cavity therebetween;*

*a foam-forming material injected into said cavity such that said foam-forming material forms a foam upon curing and adheres to said metallic top sheet member and said metallic liner sheet member so as to form a composite truck bed toolbox lid adapted to be attached to a truck bed toolbox; and*

*further comprising a plurality of stitch weld joints that fixedly couple the perimeter of said liner sheet member with said edge perimeter, such that gas permeable, non-welded gaps remain between said plurality of stitch weld joints.*

*41. The truck bed toolbox lid of claim 40, wherein a sufficient amount of the foam-forming material is injected into said cavity such that said lid can be deflected in excess of four inches while remaining uncrimped, with no permanent set, when said lid is secured on a horizontal platform with approximately half the length of said lid extending beyond said platform and said lid is subjected to center pressure adjacent one of said depending edge members.*

*42. The truck bed toolbox lid of claim 40, wherein a sufficient amount of the foam-forming material is injected into said cavity such that the final product lid can be deflected to 7.5 inches while remaining uncrimped, with no permanent set, when said lid is secured on a horizontal platform with approximately half the length of said lid extending beyond said platform and said lid is subjected to corner pressure adjacent one of said depending edge members.*

*43. A truck bed toolbox, said tool box comprising:*

*a lid formed from a metallic top sheet member having depending beveled edge members and a flat metallic liner sheet member having edges that are in substantially continuous abutment along the beveled edge members of said metallic top sheet member in a manner which defines a cavity therebetween,*

*a foam-forming material injected into the cavity of the lid such that the foam adheres to said metallic top sheet member and said metallic liner sheet member that together form the lid so as to form a strengthened composite truck bed toolbox lid,*

*a plurality of stitch weld joints that fixedly couple the perimeter of the metallic liner sheet member with said liner sheet member, said stitch weld joints including non-welded permeable gaps that permit air and gases to escape during manufacture of the lid,*

*the beveled edge members of the metallic top sheet member providing a nozzle effect to facilitate the expulsion of air and gases through said gaps; and*

*an open-topped lower receptacle having an upper perimeter that mates with, and may be closed by said lid;said open topped lower receptacle being pivotally attached to said lid such that said lid can be pivoted upwardly to expose the interior of open-topped lower receptacle.*

*44. The truck bed toolbox of claim 43, wherein said lid is formed from a sufficient amount of the foam-forming material injected into the cavity of said lid such that said lid can be deflected in excess of four inches while remaining uncrimped, with no permanent set, when said lid member, before being joined to the lower receptacle, is secured on a horizontal platform with approximately half the length of said lid extending beyond said platform and said lid is subjected to center pressure adjacent one of said depending edge members.*

*45. The truck bed toolbox of claim 43, wherein said lid is formed with a sufficient amount of the foam-forming material injected into said cavity such that said lid member can be deflected to 7.5 inches while remaining uncrimped, with no permanent set, when said lid, before being joined to the lower receptacle, is secured on a horizontal platform with approximately half the length of said lid extending beyond said platform and said lid is subjected to corner pressure adjacent one of said depending edge members.*

*46. The truck bed toolbox of claim 43, wherein, a hot melt seal is disposed along the gaps of the outer perimeter of said metallic liner sheet member and forms a seal between the inside surface of the corresponding top sheet member and the outer perimeter of the liner sheet member to retain said foam within the cavity of the lid after gas has escaped through said gas permeable gaps.*

* * * * *